US012640118B2

(12) United States Patent
Nishio et al.

(10) Patent No.: US 12,640,118 B2
(45) Date of Patent: May 26, 2026

(54) INFORMATION PROCESSING APPARATUS AND CONTROL METHOD WITH FACE ORIENTATION AND POSITION DETECTION PROCESSING

(71) Applicant: Lenovo (Singapore) Pte. Ltd., Singapore (SG)

(72) Inventors: Masashi Nishio, Kanagawa (JP); Yuji Wada, Kanagawa (JP); Shuhei Yamamoto, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 19/034,477

(22) Filed: Jan. 22, 2025

(65) Prior Publication Data

US 2026/0031063 A1     Jan. 29, 2026

(30) Foreign Application Priority Data

Jul. 24, 2024     (JP) ................................ 2024-118572

(51) Int. Cl.
| | |
|---|---|
| *G09G 5/10* | (2006.01) |
| *G06T 7/70* | (2017.01) |
| *G06V 40/16* | (2022.01) |

(52) U.S. Cl.
CPC ................. *G09G 5/10* (2013.01); *G06T 7/70* (2017.01); *G06V 40/161* (2022.01); *G09G 2320/0626* (2013.01)

(58) Field of Classification Search
CPC ............ G09G 5/10; G09G 2320/0626; G09G 2354/00; G09G 2360/145; G09G 2360/16; G09G 2320/0633; G09G 2330/021; G06T 7/70; G06V 40/161; G06V 40/16; G06F 3/012; G06F 1/3215; G06F 1/3231; G06F 1/3265; G06F 3/013
See application file for complete search history.

(56) References Cited

U.S. PATENT DOCUMENTS

| | | | | |
|---|---|---|---|---|
| 2013/0135196 A1* | 5/2013 | Park | ........................ | G06F 3/013 |
| | | | | 348/78 |
| 2021/0327394 A1* | 10/2021 | Bui | ........................ | G06F 1/3231 |
| 2024/0377539 A1* | 11/2024 | Lemarchand | ...... | G02B 27/0093 |

* cited by examiner

*Primary Examiner* — Rodney Amadiz
(74) *Attorney, Agent, or Firm* — Osha Bergman Watanabe & Burton LLP

(57) ABSTRACT

An information processing apparatus includes: a memory which temporarily stores image data of an image captured by an imaging unit; and a processor which processes the image data stored in the memory. The processor performs: face detection processing to process the image data of the image stored in the memory in order to detect a face area with a face captured therein and an orientation of the face from the image, and brightness control processing to control screen brightness of a display unit based on the orientation of the face detected by the face detection processing.

12 Claims, 11 Drawing Sheets

(A)
ANTICIPATE THAT FACE WILL NOT BE FACING FORWARD (B)
ANTICIPATE THAT FACE WILL BE FACING FORWARD

FACE ANGLE          70°                          50°

(A)                              (B)

(A)

ANTICIPATE THAT FACE WILL NOT BE FACING FORWARD $d \geq dth$ (B)

ANTICIPATE THAT FACE WILL BE FACING FORWARD $d < dth$

INFORMATION PROCESSING APPARATUS AND CONTROL METHOD WITH FACE ORIENTATION AND POSITION DETECTION PROCESSING

CROSS-REFERENCE TO RELATED APPLICATIONS

This application claims priority to Japanese Patent Application No. 2024-118572 filed on Jul. 24, 2024, the contents of which are hereby incorporated herein by reference in their entirety.

TECHNICAL FIELD

The present invention relates to an information processing apparatus and a control method.

BACKGROUND

In the field of human presence detection, an infrared sense may be used to detect whether a person is approaching or has moved away from a device.

There is room for improvement in this field with respect to the detection method and accuracy.

For example, when reducing the screen brightness in the case where the face is not facing forward (for example, facing sideways), it is desired to restore the screen brightness when the face orientation is turned to front facing again. However, when the face orientation is turned from side facing to front facing, it takes time (for example, about one second) to detect that the face orientation is turned to front facing, resulting in poor responsiveness from when the face orientation is turned to front facing until the screen brightness is restored. Therefore, there is an aspect that is difficult for the apparatus to be positively equipped with control to reduce the screen brightness according to this face orientation, and hence the apparatus may not be able to contribute enough to save power.

SUMMARY

One or more embodiments of the present invention provide an information processing apparatus and a control method with responsiveness improved when detecting the orientation of a face to control the screen brightness of a display unit.

An information processing apparatus according to one or more embodiments of the present invention includes: a memory which temporarily stores image data of an image captured by an imaging unit; and a processor which processes the image data stored in the memory, wherein the processor performs face detection processing to process the image data of the image stored in the memory in order to detect a face area with a face captured therein and an orientation of the face from the image, and brightness control processing to control the screen brightness of a display unit based on the orientation of the face detected by the face detection processing, and in the face detection processing, when the detected face orientation is within a preset first angle range, the processor determines that the face orientation is a first orientation, and even when the detected face orientation is out of the first angle range, the processor determines that the face orientation is the first orientation before falling within the first angle range based on the amount of change in the detected face orientation toward a direction of the first orientation and a face movement distance.

The above information processing apparatus may be such that, in the face detection processing, even in a case where the detected face orientation is out of the first angle range, when the detected face orientation changes at a predetermined angle or more from a second orientation out of the first angle range toward the direction of the first orientation, the processor determines whether or not the face movement distance when the face orientation changes at the predetermined angle or more is less than a predetermined value, and when the face movement distance is less than the predetermined value, the processor determines that the face orientation is the first orientation.

The above information processing apparatus may also be such that, in the face detection processing, when the change in the face orientation is a yaw angle change, the processor determines whether or not the face movement distance in a left-and-right direction is less than a predetermined value, while when the change in the face orientation is a pitch angle change, the processor determines whether or not the face movement distance in an up-and-down direction is less than a predetermined value.

The above information processing apparatus may further be such that, in the face detection processing, even in the case where the detected face orientation is out of the first angle range, when the detected face orientation changes at the predetermined angle or more from the second orientation toward the direction of the first orientation within a predetermined time, and the face movement distance is less than the predetermined value, the processor determines that the face orientation is the first orientation.

Further, the above information processing apparatus may be such that, in the face detection processing, the processor performs a process of determining whether or not the face orientation is the first orientation within a second angle range wider than the first angle range, and performs a process of determining whether or not the face orientation is the first orientation in a range out of the first angle range within the second angle range based on the amount of change in the face orientation toward the direction of the first orientation and the face movement distance.

Further, the above information processing apparatus may be such that, in the face detection processing, the processor makes a detection cycle when the detected face orientation is within the first angle range lower than a detection cycle when the detected face orientation is out of the first angle range.

Further, the above information processing apparatus may be such that, in the face detection processing, the processor makes a detection cycle when the detected face orientation is within the first angle range lower than a detection cycle when the detected face orientation is out of the first angle range within the second angle range.

Further, the above information processing apparatus may be such that, in the brightness control processing, when the face orientation detected by the face detection processing changes from the first angle range to a range out of the first angle range, the processor reduces the screen brightness.

Further, the above information processing apparatus may be such that, in the brightness control processing, when determining that the face orientation detected by the face detection processing is the first orientation in such a state that the screen brightness is reduced, the processor makes the screen brightness restored to a screen brightness before being reduced.

Further, the above information processing apparatus may be such that the imaging unit outputs image data of an image obtained by imaging a predetermined angle of view in a direction to face a screen of the display unit.

Further, a control method according to one or more embodiments of the present invention is a control method for an information processing apparatus including a memory which temporarily stores image data of an image captured by an imaging unit, and a processor which processes the image data stored in the memory, the control method including: a face detection step of causing the processor to process the image data of the image stored in the memory in order to detect a face area with a face captured therein and an orientation of the face from the image; and a brightness control step of causing the processor to control the screen brightness of a display unit based on the face orientation detected by the face detection step, wherein when the detected face orientation is within a preset first angle range in the face detection step, the processor determines that the face orientation is a first orientation, and even when the detected face orientation is out of the first angle range, the processor determines that the face orientation is the first orientation before falling within the first angle range based on the amount of change in the detected face orientation toward a direction of the first orientation and a face movement distance.

One or more embodiments of the present invention can improve responsiveness when detecting a face orientation to control the screen brightness of a display unit.

DETAILED DESCRIPTION

Embodiments of the present invention will be described below with reference to the accompanying drawings.

Overview

First, the overview of an information processing apparatus according to one or more embodiments will be described.

Figure 1:
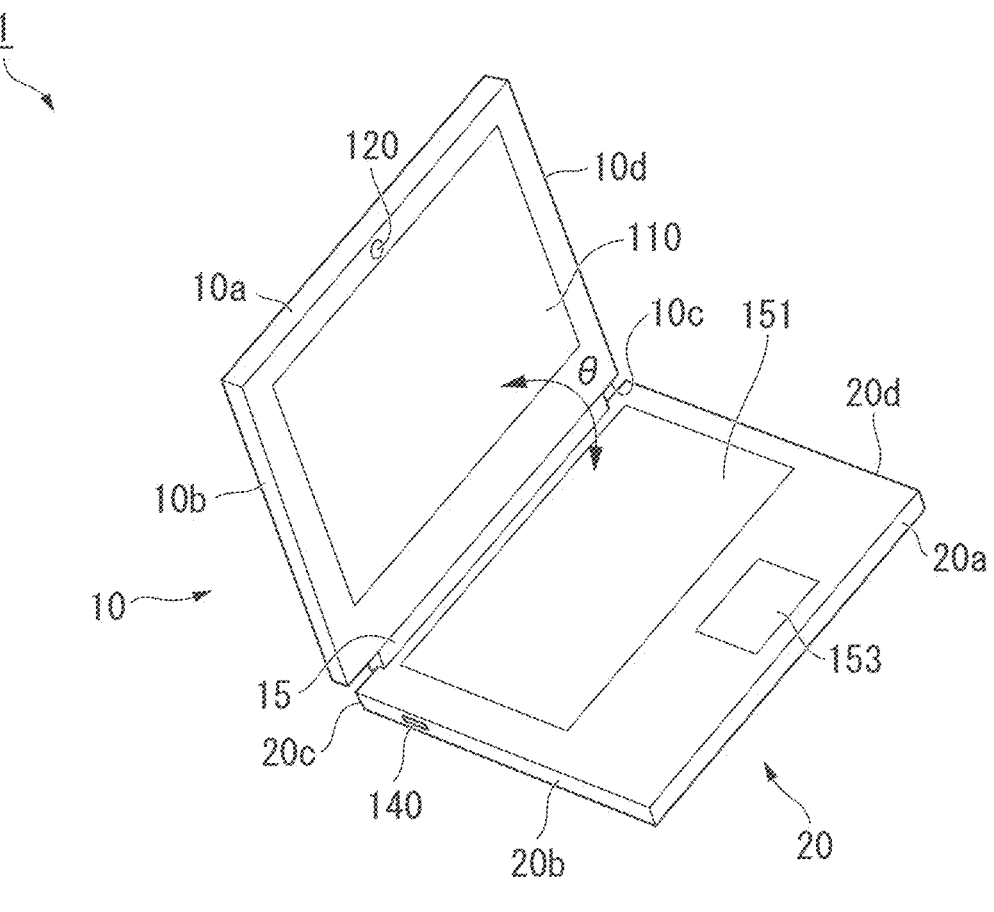
FIG. 1 is a perspective view illustrating a configuration example of the appearance of an information processing apparatus according to one or more embodiments.

FIG. 1 is a perspective view illustrating a configuration example of the appearance of an information processing apparatus 1 according to one or more embodiments.

The information processing apparatus 1 is, for example, a laptop (clamshell) PC (Personal Computer). The information processing apparatus 1 includes a first chassis 10, a second chassis 20, and a hinge mechanism 15. The first chassis 10 and the second chassis 20 are joined by using the hinge mechanism 15. The first chassis 10 is rotatable around an axis of rotation formed by the hinge mechanism 15 relative to the second chassis 20. An open angle by the rotation between the first chassis 10 and the second chassis 20 is denoted by "θ" in FIG. 1.

The first chassis 10 is also called A cover or a display chassis. The second chassis 20 is also called C cover or a system chassis. In the following description, side faces on which the hinge mechanism 15 is provided among side faces of the first chassis 10 and the second chassis 20 are referred to as side faces 10c and 20c, respectively. Among the side faces of the first chassis 10 and the second chassis 20, faces opposite to the side faces 10c and 20c are referred to as side faces 10a and 20a, respectively. In this figure, the direction from the side face 20a to the side face 20c is referred to as "rear," and the direction from the side face 20c to the side face 20a is referred to as "front." The right hand and left hand in the rearward direction are referred to as "right" and "left," respectively. Left side faces of the first chassis 10 and the second chassis 20 are referred to as side faces 10b and 20b, respectively, and right side faces thereof are referred to as side faces 10d and 20d, respectively. Further, a state where the first chassis 10 and the second chassis 20 overlap each other and are completely closed (a state of open angle θ=0°) is referred to as a "closed state." The faces of the first chassis 10 and the second chassis 20 on the face-to-face sides in the closed state are referred to as respective "inner faces," and the faces opposite to the inner faces are referred to as "outer faces." Further, a state opposite to the closed state, where the first chassis 10 and the second chassis 20 are open, is called an "open state."

The appearance of the information processing apparatus 1 in FIG. 1 illustrates an example of the open state. The open state is a state where the side face 10a of the first chassis 10 and the side face 20a of the second chassis 20 are separated. In the open state, the respective inner surfaces of the first chassis 10 and the second chassis 20 appear. The open state is one of states where a user uses the information processing apparatus 1, and the information processing apparatus 1 is often used in a state where the open angle is typically about θ=100° to 130°. Note that the range of open angles θ to be the open state can be set arbitrarily according to the range of angles rotatable by the hinge mechanism 15, or the like.

A display unit 110 is provided on the inner surface of the first chassis 10. The display unit 110 is configured to include a liquid crystal display (LCD) or an organic EL (Electro Luminescence) display, and the like. Further, an imaging unit 120 is provided in a peripheral area of the display unit 110 on the inner surface of the first chassis 10. For example, the imaging unit 120 is arranged on the side of the side face 10*a* in the peripheral area of the display unit 110. Note that the position at which the imaging unit 120 is arranged is just an example, and it may be elsewhere as long as the imaging unit 120 can face a direction to face a display screen of the display unit 110.

In the open state, the imaging unit 120 images a predetermined imaging range in a direction to face the display screen of the display unit 110 (that is, in front of the information processing apparatus 1). The predetermined imaging range is a range of angles of view defined by an image sensor included in the imaging unit 120 and an optical lens provided in front of the imaging surface of the image sensor. For example, the imaging unit 120 can capture an image including a person (user) present in front of the information processing apparatus 1.

Further, a power button 140 is provided on the side face 20*b* of the second chassis 20. The power button 140 is an operating element used by the user to give an instruction to power on or power off, make a transition from a standby state to a normal operating state, make a transition from the normal operating state to the standby state, or the like. The normal operating state is an operating state of a system capable of executing processing without being particularly limited, which corresponds, for example, to S0 state defined in the ACPI (Advanced Configuration and Power Interface) specification.

The standby state is a state in which at least part of system processing is limited, and the power consumption is lower than that in the normal operating state. For example, the standby state may be the standby state or a sleep state, Modern Standby in Windows (registered trademark), or a state corresponding to S3 state (sleep state) defined in the ACPI specification. Further, a state in which at least the display of the display unit appears to be OFF (screen OFF), or a screen lock state may also be included as the standby state. The screen lock is a state in which an image preset to make a content being processed invisible (for example, an image for the screen lock) is displayed on the display unit, that is, an unusable state until the lock is released (for example, until the user is authenticated).

Further, a keyboard 151 and a touch pad 153 are provided on the inner surface of the second chassis 20 as an input device to accept user operation input. Note that a touch sensor may also be provided as the input device instead of or in addition to the keyboard 151 and the touch pad 153, or a mouse and an external keyboard may be connected. When the touch sensor is provided, an area corresponding to the display surface of the display unit 110 may be constructed as a touch panel to accept operations. Further, a microphone used to input voice may be included in the input device.

Note that in the closed state where the first chassis 10 and the second chassis 20 are closed, the display unit 110 and the imaging unit 120 provided on the inner surface of the first chassis 10, and the keyboard 151 and the touch pad 153 provided on the inner surface of the second chassis 20 are covered with each other's chassis surfaces, and put in a state of being disabled from fulfilling the functions.

The information processing apparatus 1 executes HPD (Human Presence Detection) processing to detect a person present in front of the information processing apparatus 1 based on a captured image captured by the imaging unit 120.

Figure 2:
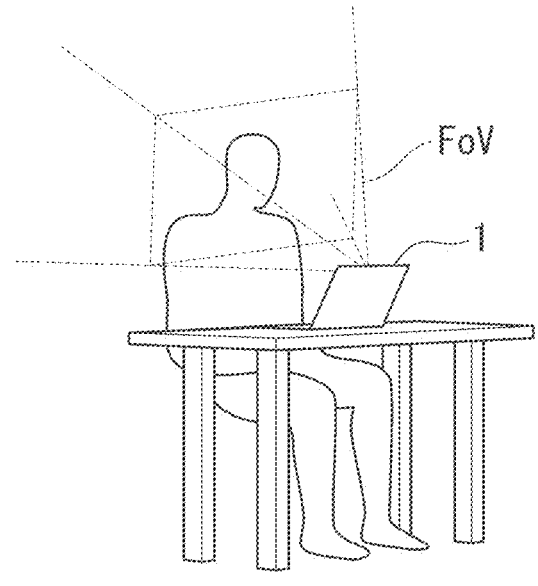
FIG. 2 is a diagram illustrating an example of a person detection range of the information processing apparatus according to one or more embodiments.

FIG. 2 is a diagram illustrating an example of a person detection range of the information processing apparatus 1 according to one or more embodiments. In the illustrated example, a detection range FoV (Field of View: detection viewing angle) in front of the information processing apparatus 1 is a person-detectable range.

For example, the information processing apparatus 1 detects a face area with a face captured therein from a captured image captured by the imaging unit 120 to determine whether or not a person (user) is present in front of the information processing apparatus 1. The detection range FoV corresponds to an imaging angle of view at which the information processing apparatus 1 captures images. When the face area is detected from the captured image, the information processing apparatus 1 determines that the person (user) is present. On the other hand, when any face area is not detected from the captured image, the information processing apparatus 1 determines that no person (user) is present.

The information processing apparatus 1 controls the operating state of the system of the information processing apparatus 1 depending on the presence or absence of the person (user) by the HPD processing. For example, when the person (user) is present in front of the information processing apparatus 1, the information processing apparatus 1 controls the operating state to the normal operating state, while when no person (user) is present in front of the information processing apparatus 1, the information processing apparatus 1 controls the operating state to the standby state.

Further, when the person (user) is present in front of the information processing apparatus 1, the information processing apparatus 1 detects the orientation of a face of the person (user). For example, the information processing apparatus 1 determines whether or not the face of the person (user) is facing the direction of the information processing apparatus 1 (the direction of the display unit 110 and the imaging unit 120). The orientation of the face here is an orientation corresponding to the rotation angle of the face in the left-and-right direction. In the following, a state where the face is facing the direction of the information processing apparatus 1 (the direction of the display unit 110 and the imaging unit 120) is assumed to be a state where the face is facing forward. Further, a state where the face is facing right or left with respect to the front direction is assumed to be a state where the face is facing sideways.

For example, the information processing apparatus 1 controls the screen brightness of the display unit 110 (dimming control) depending on whether or not the orientation of the face of the person (user) is front facing. Specifically, when the face is not facing forward (for example, when the face orientation is turned to side facing), the information processing apparatus 1 reduces the screen brightness of the display unit 110 to save power. Further, when the face orientation is turned to front facing again, the information processing apparatus 1 restores the reduced brightness to the original screen brightness before being reduced.

In the following, the original screen brightness before being reduced is called "standard brightness." Further, the screen brightness reduced from the standard brightness when the face is not facing forward (for example, when the face orientation is turned to side facing) is called "low brightness." The low brightness is brightness at least lower than the standard brightness. However, the lower the brightness, the more the effect of power saving will increase. For example, the low brightness may be a brightness of about 0 to 10% of the standard brightness.

Here, when the face orientation is turned from side facing to front facing, it takes time (for example, about one second) to detect that the face orientation is turned to front facing by face detection processing. Therefore, if the information processing apparatus 1 performs control to restore the screen brightness to the standard brightness after detecting that the face orientation is turned to front facing, there will be a delay from when the face orientation is turned to front facing until the screen brightness is restored to the standard brightness, resulting in poor responsiveness. Therefore, the information processing apparatus 1 performs control to restore the screen brightness to the standard brightness before the face is fully facing forward by detecting a change in face orientation from side facing to front facing and anticipating that the face will be facing forward.

Figure 3:
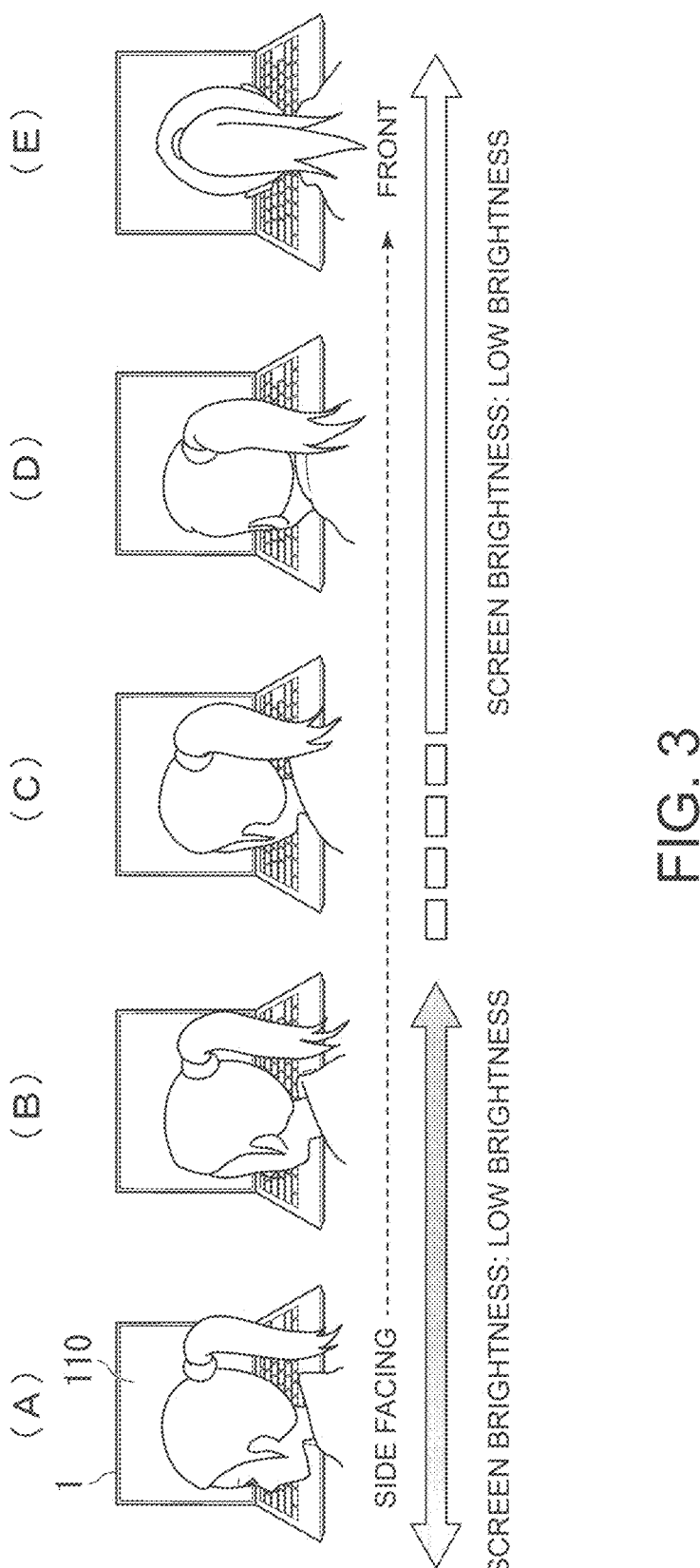
FIG. 3 is a schematic diagram for describing screen brightness control depending on a face orientation according to one or more embodiments.

FIG. 3 is a schematic diagram for describing screen brightness control depending on the face orientation according to one or more embodiments. FIG. 3 illustrates screen brightness control when the orientation of the face of the person (user) in front of the information processing apparatus 1 is turned from side facing to front facing. (A) illustrates a state where the face is facing sideways. Then, the face orientation changes toward the front gradually in the order of (B), (C), and (D), and a state where the face is fully facing forward is illustrated at (E).

In the state where the face is facing sideways illustrated at (A), the screen brightness is controlled to the low brightness. The information processing apparatus 1 determines that the face orientation is turned to front facing based on the fact that the face orientation changes toward the front as illustrated at (B) from the state where the face is facing sideways illustrated at (A), and performs control to switch the screen brightness to the standard brightness after (C) and before (E). Thus, although the screen brightness is controlled to the low brightness at (A) and (B), the screen brightness is switched to the standard brightness before the face is fully facing forward as the face orientation changes from side facing to front facing.

For example, the information processing apparatus 1 determines whether or not the face orientation is turned to front facing based on the amount of change in the face orientation toward the front. Specifically, when the face is changed toward the front at a predetermined angle or more (for example, 10° or more) within a predetermined time (for example, within one second), the information processing apparatus 1 determines that the face orientation is turned to front facing. Thus, the information processing apparatus 1 can perform control to switch to the standard brightness before the face is fully facing forward, and hence the responsiveness can be improved.

The configurations of the information processing apparatus 1 according to one or more embodiments will be described in detail below.

[Hardware Configuration of Information Processing Apparatus]

Figure 4:
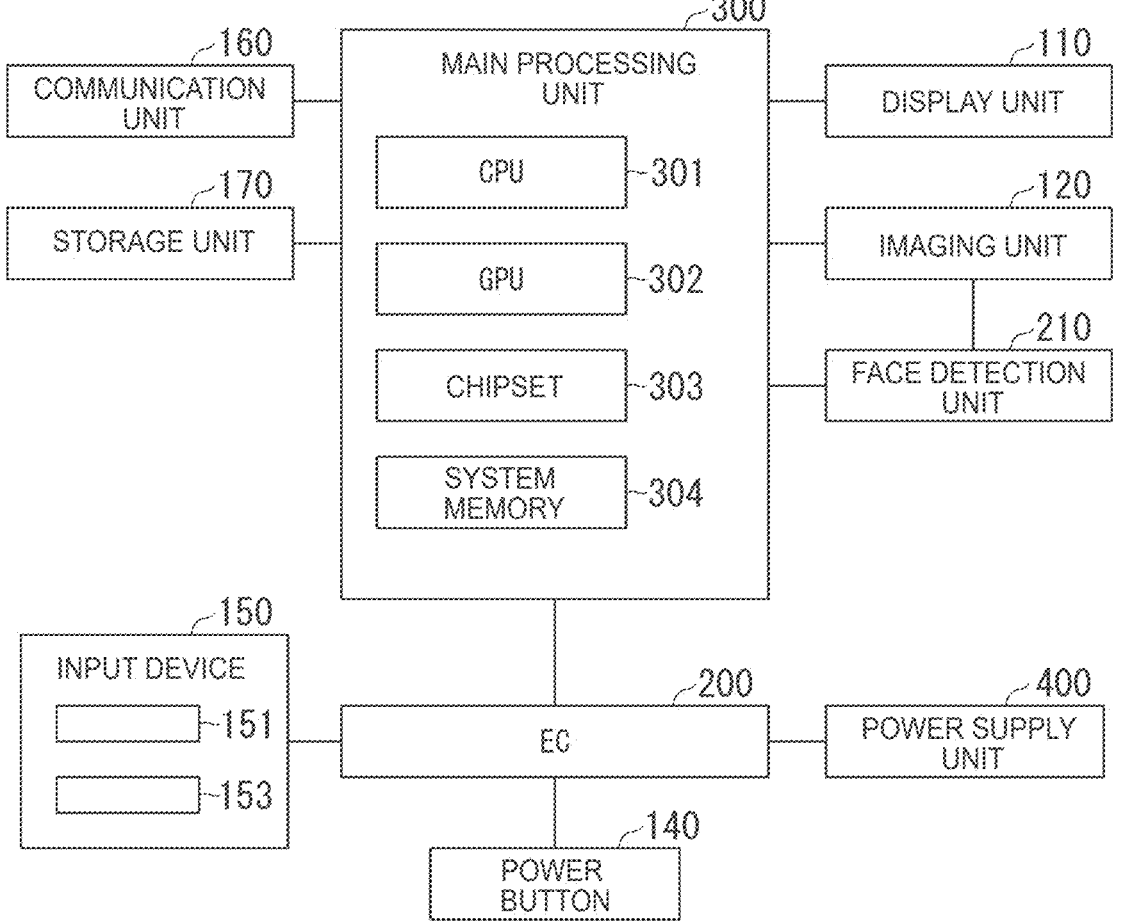
FIG. 4 is a schematic block diagram illustrating an example of the hardware configuration of the information processing apparatus according to one or more embodiments.

FIG. 4 is a schematic block diagram illustrating an example of the hardware configuration of the information processing apparatus 1 according to one or more embodiments. In FIG. 4, components corresponding to the respective units in FIG. 1 are given the same reference numerals. The information processing apparatus 1 is configured to include the display unit 110, the imaging unit 120, the power button 140, an input device 150, a communication unit 160, a storage unit 170, an EC (Embedded Controller) 200, a face detection unit 210, a main processing unit 300, and a power supply unit 400.

The display unit 110 displays display data (images) generated based on system processing executed by the main processing unit 300, processing of an application program(s) running on the system processing, and the like.

The imaging unit 120 captures an image of an object within the predetermined imaging range (angle of view) in the direction (frontward) to face the inner surface of the first chassis 10, and outputs the captured image to the main processing unit 300 and the face detection unit 210. For example, the imaging unit 120 includes a visible light camera (RGB camera) for capturing an image using visible light and an infrared camera (IR camera) for capturing an image using infrared light.

Note that the imaging unit 120 may be configured to include either one of the visible light camera and the infrared camera, or may be configured to include both of the visible light camera and the infrared camera.

The power button 140 outputs, to the EC 200, an operation signal according to a user operation. The input device 150 is an input unit for accepting user input, which is configured to include, for example, the keyboard 151 and the touch pad 153. In response to accepting operations on the keyboard 151 and the touch pad 153, the input device 150 outputs, to the EC 200, operation signals indicative of operation contents.

The communication unit 160 is connected to other devices communicably through a wireless or wired communication network to transmit and receive various data. For example, the communication unit 160 is configured to include a wired LAN interface such as Ethernet (registered trademark), a wireless LAN interface such as Wi-Fi (registered trademark), and the like.

The storage unit 170 is configured to include storage media, such as an HDD (Hard Disk Drive) or an SSD (Solid State Drive), a RAM, and a ROM. The storage unit 170 stores an OS, device drivers, various programs such as applications, and various data acquired by the operation of the programs.

The power supply unit 400 supplies power to each unit according to the operating state of each unit of the information processing apparatus 1. The power supply unit 400 includes a DC (Direct Current)/DC converter. The DC/DC converter converts the voltage of DC power, supplied from an AC (Alternate Current)/DC adapter or a battery (battery pack), to a voltage required for each unit. The power with the voltage converted by the DC/DC converter is supplied to each unit through each power system. For example, the power supply unit 400 supplies power to each unit through each power system based on a control signal input from the EC 200.

The EC 200 is a microcomputer configured to include a CPU (Central Processing Unit), a RAM (Random Access Memory), a ROM (Read Only Memory), an I/O (Input/Output) logic circuit, and the like. The CPU of the EC 200 reads a control program (firmware) prestored in the own ROM, and executes the read control program to fulfill the functionality. The EC 200 operates independently of the main system processing unit 300 to control the operation of the main processing unit 300 and manage the operating state of the main processing unit 300. Further, the EC 200 is connected to the power button 140, the input device 150, the power supply unit 400, and the like.

For example, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the information processing apparatus 1. Further, the EC 200 acquires operation signals from the power button 140 and the input device 150, and outputs, to the main processing unit 300, an operation signal related to processing of the main processing unit 300 among the acquired operation signals.

The face detection unit 210 is configured to include a processor for processing image data of a captured image captured by the imaging unit 120. The face detection unit 210 acquires the image data of the captured image captured by the imaging unit 120, and temporarily stores the acquired image data in a memory. The memory in which the image data is stored may be a system memory 304, or an unillustrated memory in the face detection unit 210.

For example, the face detection unit 210 processes the image data of the captured image acquired from the imaging unit 120 to perform face detection processing for detecting a face area from the captured image, detecting the orientation of a face of a face image in the detected face area, and the like. As the face detection method, any detection method using a face detection algorithm for detecting a face based on facial feature information, trained data (learned model) subjected to machine learning based on the facial feature information, a face detection library, or the like can be applied.

Further, in the face detection processing, the face detection unit 210 performs face direction determination processing to determine whether or not the face is facing forward as described with reference to FIG. 3. The face detection unit 210 determines whether or not the face is facing forward based on the orientation of the face detected from the captured image, and transmits the determination result to the main processing unit 300. Further, the face detection unit 210 controls a detection frame rate when performing the face detection processing.

The main processing unit 300 is configured to include a CPU (Central Processing Unit) 301, a GPU (Graphic Processing Unit) 302, a chipset 303, and the system memory 304, where processing of various application programs is executable on the OS (Operating System) by system processing based on the OS.

The CPU 301 is a processor which executes processing based on a BIOS program, processing based on the OS program, processing based on application programs running on the OS, and the like. For example, the CPU 301 executes boot processing to boot the system from the standby state and make the transition to the normal operating state, sleep processing to make the transition from the normal operating state to the standby state, and the like. Further, the CPU 301 executes screen brightness control processing to control the screen brightness of the display unit 110 based on the result of the face detection processing by the face detection unit 210 described above, and the like.

The GPU 302 is connected to the display unit 110. The GPU 302 executes image processing under the control of CPU 301 to generate display data. The GPU 302 outputs the generated display data to the display unit 110.

The chipset 303 has a function as a memory controller, a function as an I/O controller, and the like. For example, the chipset 303 controls reading data from and writing data to the system memory 304, the storage unit 170, and the like by the CPU 301 and GPU 302. Further, the chipset 303 controls input/output of data from the communication unit 160, the display unit 110, and the EC 200. Further, the chipset 303 has a function as a sensor hub. For example, the chipset 303 acquires the detection result by the face detection processing from the face detection unit 210, and outputs the detection result to the CPU 301.

The system memory 304 is used as a reading area of a program executed by the CPU 301 and a working area to write processed data. Further, the system memory 304 temporarily stores image data of a captured image captured by the imaging unit 120.

Note that the CPU 301, the GPU 302, and the chipset 303 may be integrated as one processor, or some or each of them may be configured as an individual processor, respectively. For example, in the normal operating state, the CPU 301, the GPU 302, and the chipset 303 are all operating, but in the standby state, only at least some of the functions of the chipset 303 are operating.

[Functional Configuration of Information Processing Apparatus]

Next, the functional configuration of the information processing apparatus 1 to perform screen brightness control depending on the face orientation will be described in detail.

Figure 5:
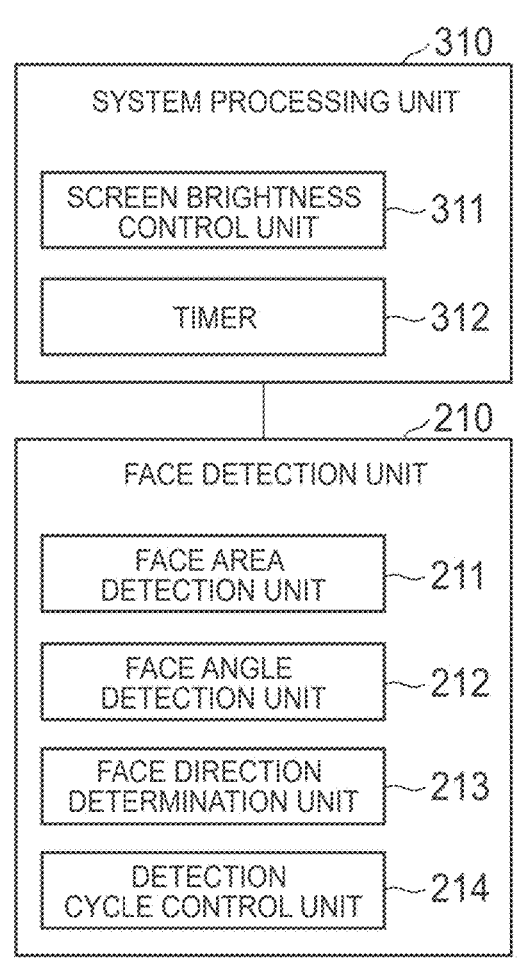
FIG. 5 is a schematic block diagram illustrating an example of the functional configuration of the information processing apparatus according to one or more embodiments.

FIG. 5 is a schematic block diagram illustrating an example of the functional configuration of the information processing apparatus 1 according to one or more embodiments. The information processing apparatus 1 includes the face detection unit 210 and a system processing unit 310. The face detection unit 210 corresponds to the face detection unit 210 in FIG. 4, and includes a face area detection unit 211, a face angle detection unit 212, a face direction determination unit 213, and a detection cycle control unit 214 as functional components to perform the face detection processing.

The face area detection unit 211 processes image data of a captured image acquired from the imaging unit 120 to detect a face area with a face captured therein from the captured image.

The face angle detection unit 212 detects the orientation of the face (face angle) captured in the face area detected from the captured image by the face area detection unit 211. For example, the face angle detection unit 212 detects the face angle in a range of ±90° by setting, as 0°, a face angle when the face is facing forward. The face direction determination unit 213 determines whether or not the face is facing forward based on the face angle detected by the face angle detection unit 212.

Figure 6:
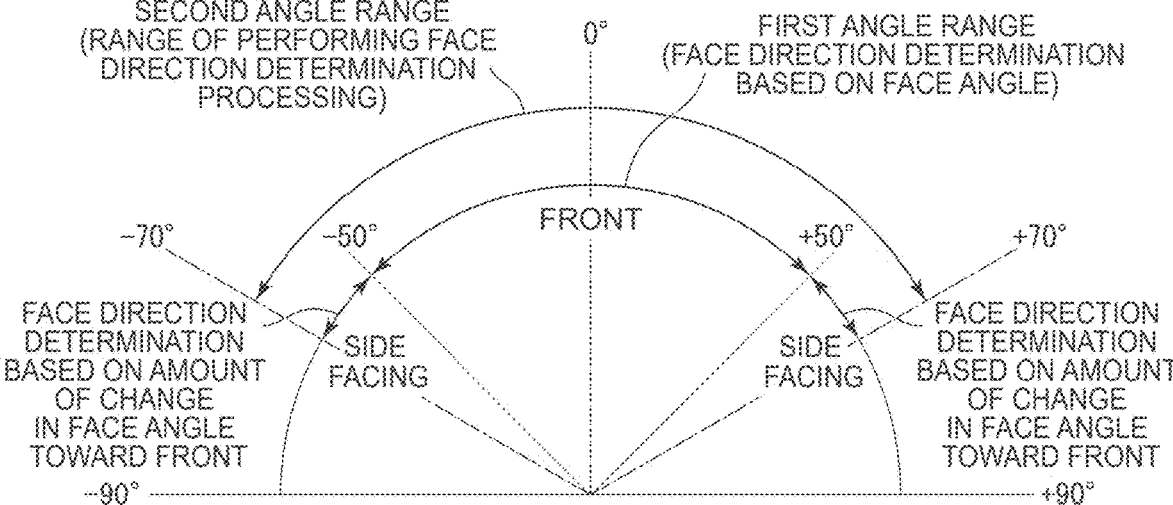
FIG. 6 is a diagram illustrating an example of face angles used in face direction determination processing according to one or more embodiments.

FIG. 6 is a diagram illustrating an example of face angles used in the face direction determination processing according to one or more embodiments. In FIG. 6, a face angle of 0° is when the face is fully facing forward, and a face angle of +90° or −90° is when the face is fully facing sideways. For example, the face angle detection unit 212 detects the face angle within the range of ±90°. This is because facial features are less likely to be captured when the face angle is out of the range of ±90° and hence the face area cannot be detected correctly.

The face direction determination unit 213 performs face direction determination processing of whether or not the face is facing forward based on the face angle detected by the face angle detection unit 212 within a second angle range (for example, a range of ±70°), and does not perform the face direction determination processing when the face angle is out of the second angle range (for example, the range of ±70°). For example, when the face angle detected by the face angle detection unit 212 is in a first angle range (for example, a range of ±50°) within the second angle range, the face direction determination unit 213 determines that the face is facing forward. Therefore, when the face angle detected by the face angle detection unit 212 is out of the first angle range (for example, the range of ±50°) within the second angle range, the face direction determination unit 213 determines that the face is not facing forward (that is, that the face is facing sideways).

Further, even when the face angle detected by the face angle detection unit 212 is out of the first angle range (for example, the range of ±50°) (that is, side facing), the face direction determination unit 213 determines, based on the amount of change in the detected face orientation from side facing to front facing, that the face is facing forward (that the face orientation is turned to front facing) before the face angle falls within the first angle range. Specifically, when the face angle changes toward the front at the predetermined angle or more (for example, 10° or more) within the predetermined time (for example, within one second), the information processing apparatus 1 anticipates that the face will be facing forward, determines that the face orientation is turned to front facing before the face angle falls within the first angle range (for example, the range of ±50°), and sets the face angle to 0°.

Thus, the face direction determination unit 213 performs the face direction determination processing described above in the second angle range (for example, the range of ±70°) wider than the first angle range (for example, the range of ±50°) in which the face orientation is determined to be front facing based on the face angle. The face direction determination unit 213 performs the face direction determination processing to determine whether or not the face is facing forward based on the amount of change in the face orientation from side facing to front facing out of the first angle range (for example, the range of "+50° to +70°") and the range of −50° to −70°) within the second angle range.

Further, when determining that the face is facing forward (or the face orientation is turned to front facing), the face direction determination unit 213 outputs, to the system processing unit 310, "Attention" information as information indicative of a state where the user is looking at (paying attention to) the information processing apparatus 1. On the other hand, when determining that the face is not facing forward, the face direction determination unit 213 outputs, to the system processing unit 310, "No Attention" information as information indicative of a state where the user is not looking at (paying attention to) the information processing apparatus 1.

Returning to FIG. 5, the detection cycle control unit 214 controls the detection frame rate (detection cycle) in the face detection processing based on the face angle detected by the face angle detection unit 212. For example, the detection cycle control unit 214 makes the detection frame rate when the face angle is within the first angle range (for example, the range of ±50°) lower than the detection frame rate when the face angle is out of the first angle range (for example, the range of ±50°). More specifically, the detection cycle control unit 214 makes the detection frame rate when the face angle is within the first angle range (for example, the range of ±50°) lower than the detection frame rate when the face angle is out of the first angle range (for example, the range of ±50°) within the second angle range (for example, the range of ±70). Thus, when the face angle is within the first angle range (for example, the range of ±50°) (that is, when the face is facing forward), an increase in power consumption when the user is using the information processing apparatus 1 can be suppressed.

On the other hand, in a case where the screen brightness is set to the low brightness, when the face angle is out of the first angle range (for example, the angle of ±50°) but within the second angle range (for example, the range of ±70°), the detection frame rate increases to allow for instant switching to the standard brightness as soon as the face orientation is turned to front facing. Note that, although power consumption increases by increasing the detection frame rate in this case, the total power consumption can be reduced because the screen brightness is controlled to the low brightness.

As an example, when the face angle is within the range of ±50°, the detection cycle control unit 214 reduces the detection frame rate to "1 fps," while when the face angle is within the range of ±50° to ±70°, the detection cycle control unit 214 increases the detection frame rate to "15 fps." Note that, when the face angle is in a range of more than ±70°, the detection frame rate is controlled to "1 fps" because the face direction determination processing is not performed and hence there is no need to increase the detection frame rate.

In the following, a mode for performing the face detection processing at a high frame rate (for example, 15 fps) is called an "HP (High Power) mode," and a mode for performing the face detection processing at a low detection frame rate (for example, 1 fps) is called an "LP (Low Power) mode."

The system processing unit 310 is a functional component implemented by the CPU 301 executing the BIOS and OS programs. For example, the system processing unit 310 includes a screen brightness control unit 311 and a timer 312 as functional components implemented by executing the OS program.

The screen brightness control unit 311 controls the screen brightness of the display unit 110 based on the face orientation detected by the face detection unit 210. For example, when acquiring the "No Attention" information from the face detection unit 210 in the normal operating state, the screen brightness control unit 311 controls the screen brightness to the low brightness. In other words, when the face orientation detected by the face detection unit 210 changes from the first angle range (for example, the range of ±50°) to a range out of the first angle range, the screen brightness control unit 311 reduces the screen brightness.

Further, when acquiring the "Attention" information from the face detection unit 210 in a state where the screen brightness is controlled to the low brightness, the screen brightness control unit 311 restores the screen brightness to the standard brightness. In other words, when determining that the face orientation detected by the face detection unit 210 in the state where the screen brightness is reduced is front facing, the screen brightness control unit 311 restores the screen brightness to the standard brightness before being reduced.

The timer 312 is a timer for measuring a waiting time after the acquisition of the "No Attention" information from the face detection unit 210 until the control of the screen brightness to the low brightness in the normal operating state. When acquiring the "Attention" information before a predetermined waiting time elapses even after acquiring the "No Attention" information, the screen brightness control unit 311 maintains the standard brightness without controlling the screen brightness to the low brightness. After the "No Attention" information is acquired, when the "Attention" information is not acquired during the predetermined waiting time, the screen brightness control unit 311 controls the screen brightness to the low brightness. Thus, the screen brightness can be prevented from being controlled to the low brightness when the user just looks away while using the information processing apparatus 1. The predetermined waiting time is preset, for example, to ten seconds or the like. Note that this predetermined waiting time may be settable by the user.

Detection states by the face detection processing and control state by screen brightness processing when the face orientation changes from side facing to front facing will be described with reference to FIG. 7.

Figure 7:
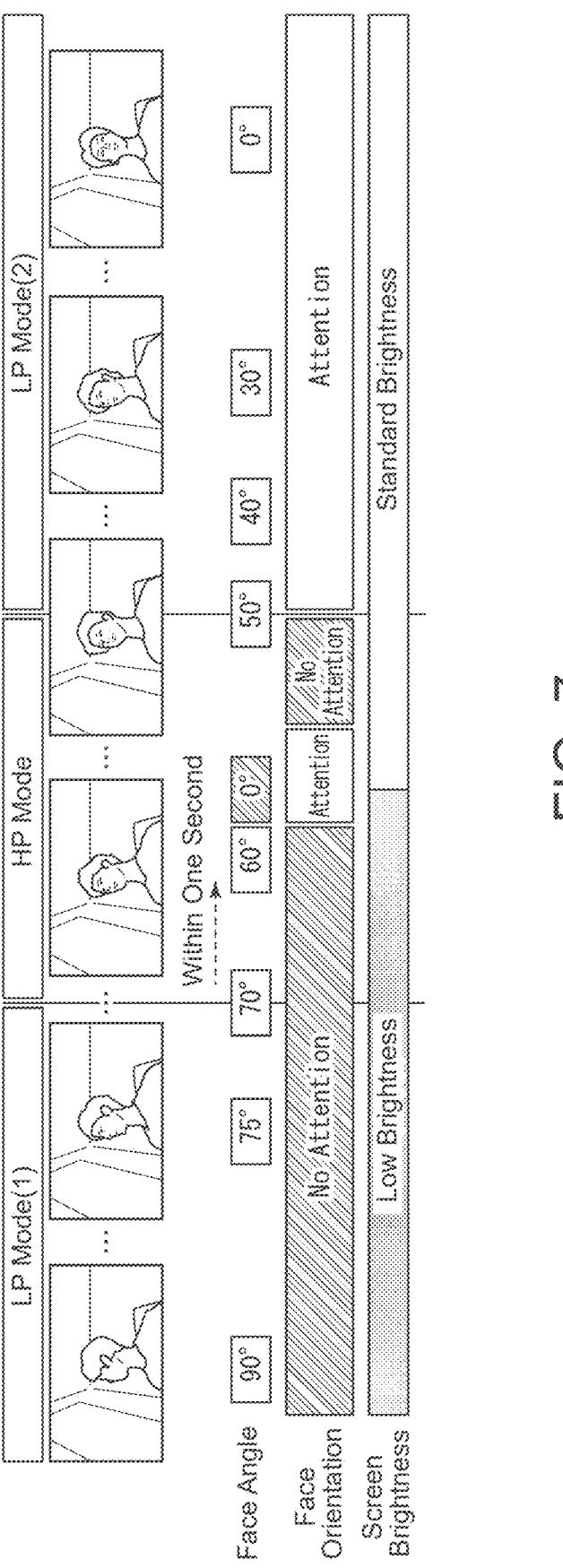
FIG. 7 is a schematic diagram illustrating an example of detection states by face detection processing and control states by screen brightness processing according to one or more embodiments.

FIG. 7 is a schematic diagram illustrating an example of the detection states by the face detection processing and the control states by the screen brightness processing according to one or more embodiments. Note that, since positive and negative values of the face angle are processed in the same way, the positive and negative values will be indicated and described as an absolute value below. For example, the absolute value of "±50°" will be indicated and described as "50°."

While the detected face angle is within a range of 90° to 70°, the detection frame rate is controlled to an LP mode ("LP mode (1)" illustrated in FIG. 7). Further, the face orientation is determined not to be front facing ("No Attention"), and the screen brightness is controlled to the low brightness. Then, when the face angle becomes less than 70°, the detection frame rate is switched from the LP mode ("LP mode (1)" illustrated in FIG. 7) to an HP mode, and the face direction determination processing is started. For example, when the face orientation changes from 70° to 60° (changes by 10° or more) within one second, it is determined that the face orientation is turned to front facing ("Attention") by setting the face angle as 0°, and the screen brightness is controlled from the low brightness to the standard brightness. After that, until the detected face angle becomes 50°, it is determined that the face is not facing forward ("No Attention") because the face angle is 50° or more. However, since the waiting time (for example, 10 seconds) for switching from the standard brightness to the low brightness is set, the standard brightness continues. When the detected face angle becomes less than 50°, since it is determined that the face is facing forward ("Attention"), the standard brightness still continues. In other words, the screen brightness is switched to the standard brightness before the face is fully facing forward as the face orientation changes from side facing to front facing.

Further, when the detected face angle becomes less than 50°, the detection frame rate is switched from the HP mode to an LP mode ("LP mode (2)" illustrated in FIG. 7). Thus, when the screen brightness is the standard brightness and the face is facing forward ("Attention"), the detection frame rate is set to the LP mode to reduce power consumption, while when the face direction determination processing is being performed in such a state that the screen brightness is controlled to the low brightness, the detection frame rate is set to the HP mode so that the screen brightness can be instantly restored to the standard brightness when the face orientation is turned to front facing ("Attention").

Thus, when detecting the orientation of the face of the user to control the screen brightness of the display unit 110, the information processing apparatus 1 detects that the face orientation is turned to front facing before the face is fully facing forward based on a change in the face orientation (face angle) of the user to front facing. However, since the face (face angle) of the user is detected from a point of view of the imaging unit 120 (a point of view of a camera), there is a concern that the face angle detected when the face is moved, for example, horizontally or vertically changes even though the user does not actually change the face orientation and hence it is detected that the face orientation is changed.

Figure 8:
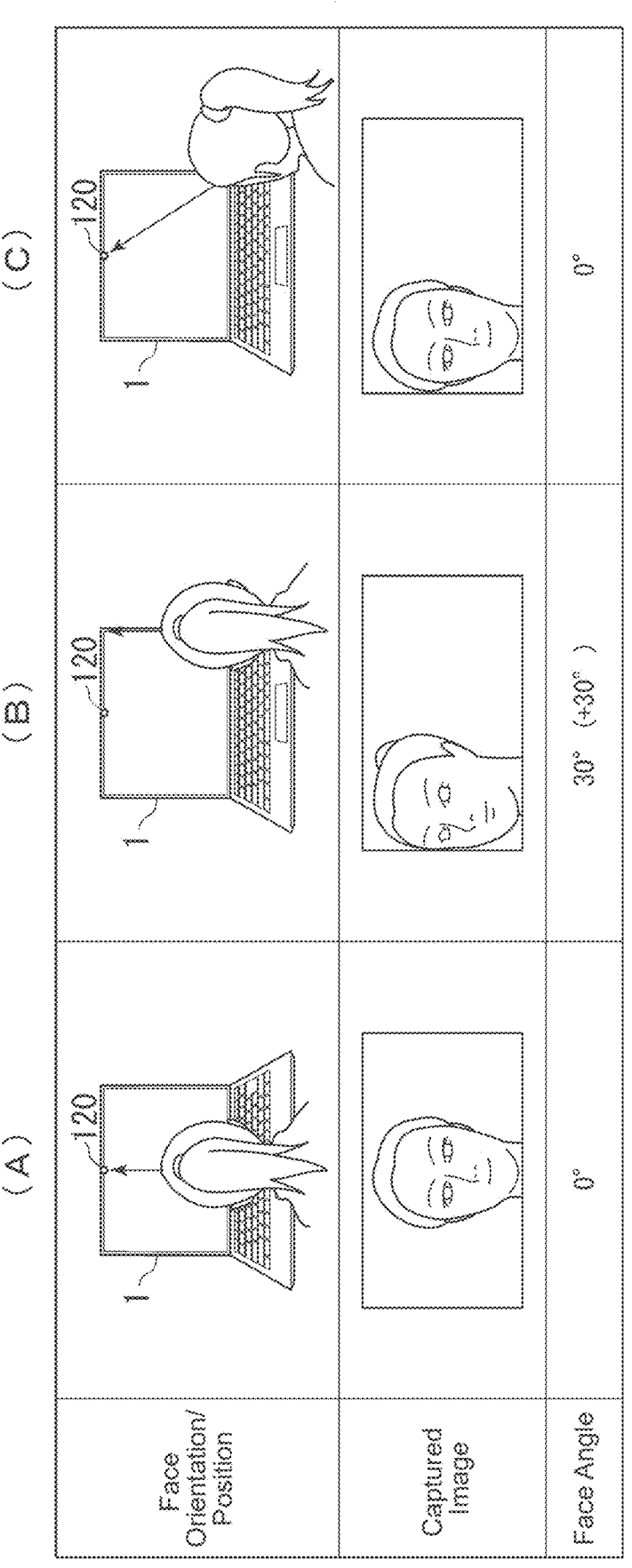
FIG. 8 is a schematic diagram illustrating detection examples of face angles from a point of view of a camera according to one or more embodiments.

FIG. 8 is a schematic diagram illustrating detection examples of face angles from the point of view of the camera according to one or more embodiments. FIG. 8 illustrates a relationship among the orientation and position of the face of the user relative to the information processing apparatus 1 (horizontal position), each captured image captured by the imaging unit 120, and a face angle detected from the captured image (that is, a face angle detected from the point of view of the camera).

(A) is an example in which both the orientation and the position of the face of the user are in front of the information processing apparatus 1. At this time, the face of the user facing forward appears in the center of the captured image captured by the imaging unit 120, and the face angle detected from the captured image (that is, the face angle from the point of view of the camera) becomes 0° indicative of the front direction (see FIG. 6).

(B) is an example in which the position of the face is moved to the right of the information processing apparatus 1 though the face orientation of the user is not different from that at (A). At this time, since the face of the user facing a direction of the left edge of the information processing apparatus 1 appears on the left side of the captured image captured by the imaging unit 120, the face angle detected from the captured image (that is, the face angle from the point of view of the camera) changes from the direction of the imaging unit 120 (front direction) to the left, and hence becomes 30° (+30°), for example.

(C) is an example in which the face orientation changes toward the imaging unit 120 though the position of the face of the user is not different from that at (B). At this time, since the orientation of the face of the user at the left edge of the captured image captured by the imaging unit 120 is facing the direction of the imaging unit 120, the face angle detected from the captured image (that is, the face angle from the point of view of the camera) becomes 0° indicative of the front direction.

Thus, even when the face orientation of the user does not change, the face angle from the point of view of the camera may change by changing the position of the face. Therefore, for example, when the body of the user sways a little side to side to just move the face even though the user does not change the face orientation, there will be a possibility to falsely detect that the face orientation (face angle) changes in the front direction even though the user has not looked at the screen of the information processing apparatus 1.

Figure 9:
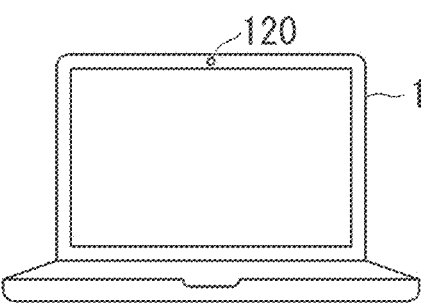
FIG. 9 is a diagram illustrating an example of a false detection of a face angle according to one or more embodiments.
Figure 9:
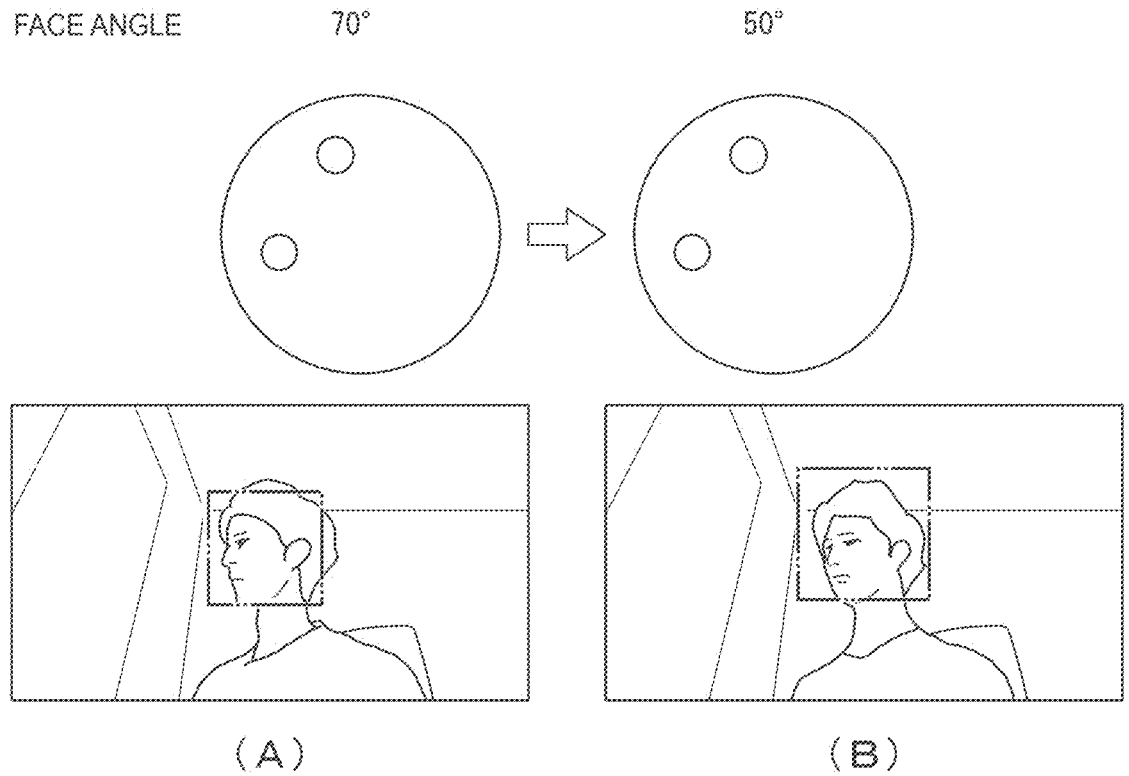

FIG. 9 is a diagram illustrating an example of false detection of a face angle according to one or more embodiments. FIG. 9 illustrates an example in which the face angle changes in the front direction due to the fact that the face is moved sideways even though the actual face orientation does not change in a situation where the user is facing sideways relative to the information processing apparatus 1. In the illustrated example, a face angle detected from a captured image captured by the imaging unit 120 is 70° at a user's position illustrated at (A), but the detected value of the face angle is 50° as illustrated at (B) due to the fact that the face is moved sideways while maintaining the actual face orientation, and the face angle looks like to change in the front direction from the point of view of the camera.

Here, as described with reference to FIG. 6, when the face angle changes toward the front at the predetermined angle or more (for example, 10° or more) within the predetermined time (for example, within one second) in a range out of the first angle range within the second angle range (for example, the range of 70° to) 50°, the face direction determination unit 213 determines that the face orientation is turned to front facing, and sets the face angle to 0°. Therefore, if the face direction determination unit 213 determines that the face orientation is turned to front facing due to the fact that the face is moved a little sideways even though the actual orientation is still side facing as illustrated in FIG. 9, resulting in a false determination. For example, when the face direction determination unit 213 makes a false determination in a state where the screen brightness is the low brightness, it is undesirable because the screen brightness becomes the standard brightness even though the face of the user is not facing forward. Further, when the result of the determination of whether or not the face orientation is turned to front facing by the face direction determination unit 213 changes every time the face of the user sways, it is undesirable because of causing such a blinking phenomenon that the screen brightness becomes the low brightness or the standard brightness.

Therefore, when the face angle changes toward the front at the predetermined angle or more (for example, 10° or more) within the predetermined time (for example, within one second), the face direction determination unit 213 determines whether or not the face orientation is turned to front facing in consideration of not only the amount of change in the face angle but also a face movement distance.

Figure 10:
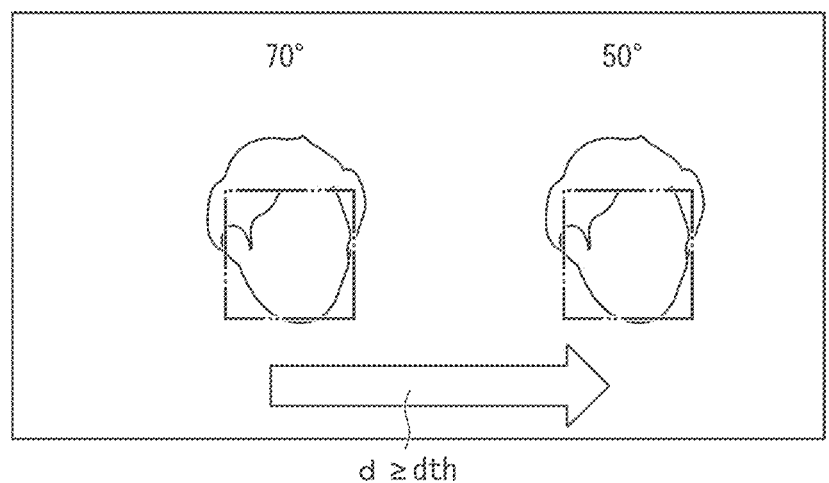
FIG. 10 is a diagram illustrating an example of a determination by a face movement distance according to one or more embodiments.
Figure 10:
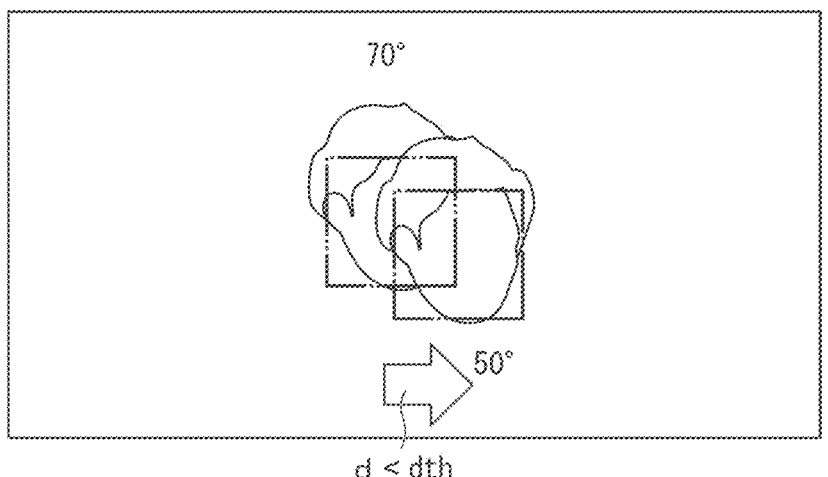

FIG. 10 is a diagram illustrating an example of a determination by the face movement distance according to one or more embodiments. For example, as illustrated at (A), even when the face angle changes toward the front at the predetermined angle or more (for example, 10° or more) within the predetermined time (for example, within one second), if the face movement distance at the time is a predetermined value or more (d≥dth), the face direction determination unit 213 considers that a change in face angle is detected by a change in face position even though the actual face orientation does not change, anticipates that the face will not be facing forward, and determines that the face is not facing forward (that is, facing sideways).

On the other hand, as illustrated at (B), in a case where the face movement distance is less than the predetermined value (d<dth) when the face angle changes toward the front at the predetermined angle or more (for example, 10° or more) within the predetermined time (for example, within one second), the face direction determination unit 213 anticipates that the face will be facing forward, and sets the face angle to 0° by determining that the face orientation is turned to front facing before the face angle falls within the first angle range (for example, the range of ±50°).

Here, for example, a threshold value (the predetermined value dth mentioned above) for determining a face movement distance (d) may be 50% of the width of a face area (bounding box) of the detected face. Note that the threshold value (the predetermined value dth mentioned above) may be a preset value (pixel value), or may be a value (pixel value) preset according to the distance to the detected face.

In other words, even when the face angle detected by the face angle detection unit 212 is out of the first angle range (for example, the range of ±50°) (that is, sideways), the face direction determination unit 213 determines that the face is facing forward (that the face orientation is turned to front facing) before the face angle falls within the first angle range based on the amount of change in the detected face orientation from side facing to front facing, and the face movement distance. Specifically, when the face angle changes toward the front at the predetermined angle or more (for example, 10° or more) within the predetermined time (for example, within one second), the information processing apparatus 1 determines whether or not the face movement distance when the face orientation changes at the predetermined angle or more is less than the predetermined value, and when the face movement distance is less than the predetermined value, the information processing apparatus 1 determines that the face orientation is turned to front facing, and sets the face angle to 0°.

Here, the movement of the face is not limited to the horizontal movement, and there is also a vertical movement. When the face moves horizontally (in the left-and-right direction), it may be detected as a change in face angle in the horizontal (yaw) direction from the point of view of the camera even if the face orientation does not change. Further, when the face moves vertically (in the up-and-down direction), it may be detected as a change in face angle in the vertical (pitch) direction from the point of view of the camera even if the face orientation does not change. Therefore, when the change in face orientation (face angle) is a yaw angle change, the face direction determination unit 213 determines whether or not the face movement distance in the horizontal direction is less than the predetermined value. Further, when the change in face orientation (face angle) is a pitch angle change, the face direction determination unit 213 determines whether or not the face movement distance in the vertical direction is less than the predetermined value.

[Operation of Processing]

Next, the operation of face direction determination processing executed by the face detection unit 210 and screen brightness control processing executed by the system processing unit 310 will be described.

Figure 11:
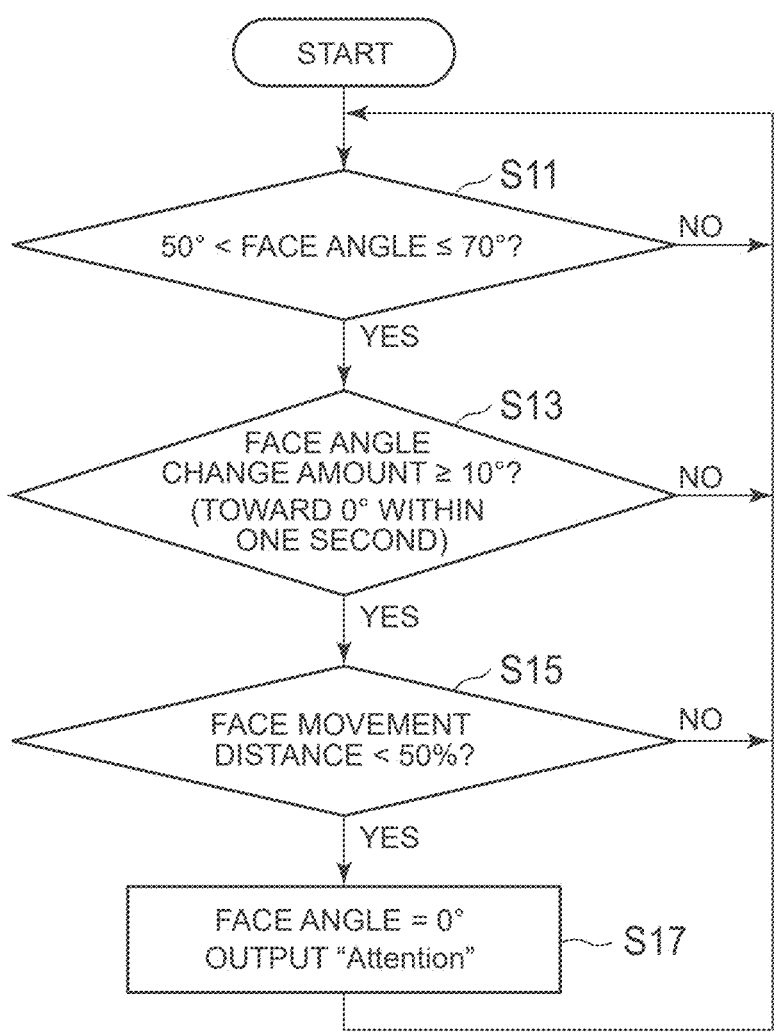
FIG. 11 is a flowchart illustrating an example of basic face direction determination processing according to one or more embodiments.

Referring first to FIG. 11, the basic operation of face direction determination processing by the face detection unit 210 to determine that the face orientation is turned to front facing based on the amount of change of the face orientation and the face movement distance outside the first angle range will be described. FIG. 11 is a flowchart illustrating an example of basic face direction determination processing according to one or more embodiments.

(Step S11) The face detection unit 210 detects a face angle based on a captured image acquired from the imaging unit 120 to determine whether or not the detected face angle is more than 50° and equal to or less than 70° (50°<face angle≤70°). When determining that the detected face angle is not more than 50° and equal to or less than 70° (NO), the face detection unit 210 performs the process in step S11 again. On the other hand, when determining that the detected face angle is more than 50° and equal to or less than 70° (YES), the face detection unit 210 proceeds to a process in step S13.

(Step S13) The face detection unit 210 determines whether or not the amount of change in the detected face angle is a change toward the front (toward 0°) by 10° or more within one second. When determining that the face angle does not change toward the front by 10° or more within one second (NO), the face detection unit 210 returns to the process in step S11. On the other hand, when determining that the face angle changes toward the front by 10° or more within one second (YES), the face detection unit 210 proceeds to a process in step S15.

(Step S15) The face detection unit 210 determines whether or not the face movement distance when the face angle changes by 10° or more in step S13 is less than the predetermined value (for example, 50% of the width of a face area (bounding box)). When determining that the face movement distance is equal to or more than the predetermined value (NO), the face detection unit 210 returns to the process in step S11. On the other hand, when determining that the face movement distance is less than the predetermined value (YES), the face detection unit 210 proceeds to a process in step S17.

(Step S17) The face detection unit 210 determines that the face will be facing forward, sets the face angle to 0°, and outputs the "Attention" information to the system processing unit 310.

Figure 12:
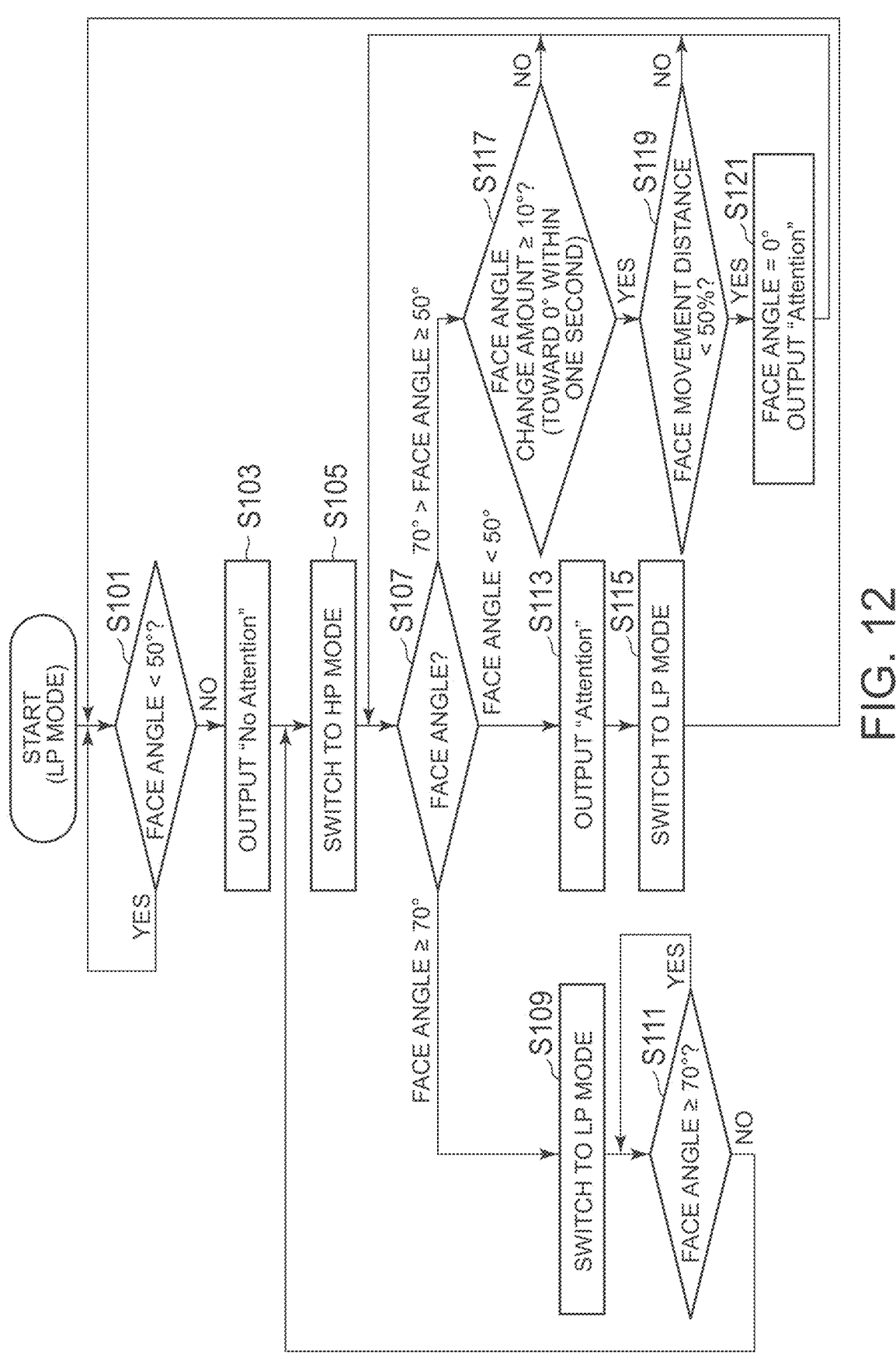
FIG. 12 is a flowchart illustrating an example of overall face direction determination processing according to one or more embodiments.

Referring next to FIG. 12, the overall operation of face direction determination processing by the face detection unit 210 will be described. FIG. 12 is a flowchart illustrating an example of overall face direction determination processing according to one or more embodiments. Here, it is assumed that the information processing apparatus 1 is in the normal operating state, the face of the user is facing forward, and the information processing apparatus 1 is performing the face detection processing in the LP mode.

(Step S101) In the LP mode, the face detection unit 210 detects a face angle based on a captured image acquired from the imaging unit 120 to determine whether or not the detected face angle is less than 50° (within the range of ±50°). When determining that the detected face angle is less than 50° (YES), the face detection unit 210 determines that the face is facing forward, and performs the process in step S101 again. On the other hand, when determining that the detected face angle is equal to or more than 50° (out of the range of ±50°) (NO), the face detection unit 210 proceeds to a process in step S103.

(Step S103) The face detection unit 210 determines that the face is not facing forward, outputs the "No Attention" information to the system processing unit 310, and proceeds to a process in step S105.

(Step S105) the face detection unit 210 switches from the LP mode to the HP mode under the control of the system processing unit 310, and detects a face angle based on a captured image acquired from the imaging unit 120 in the HP mode. For example, after outputting the "No Attention" information to the system processing unit 310 in step S103, the face detection unit 210 waits for an instruction to switch to the HP mode from the system processing unit 310 before switching to the HP mode. Then, the face detection unit 210 proceeds to a process in step S107.

(Step S107) The face detection unit 210 determines the face angle detected in the HP mode. When determining that the detected face angle is equal to or more than 70°, the face detection unit 210 proceeds to a process in step S109. On the other hand, when determining that the detected face angle is less than 50°, the face detection unit 210 proceeds to a process in step S113. Further, when determining that the detected face angle is equal to or more than 50° but less than 70°, the face detection unit 210 proceeds to a process in step S117.

(Step S109) When the face angle is equal to or more than 70°, since the face direction determination processing is not performed, the face detection unit 210 switches from the HP mode to the LP mode, and detects a face angle based on a captured image acquired from the imaging unit 120 in the LP mode. Then, the face detection unit 210 proceeds to a process in step S111.

(Step S111) The face detection unit 210 determines whether or not the face angle detected in the LP mode is equal to or more than 70° (out of the range of ±70°). When determining that the detected face angle is equal to or more than 70° (YES), the face detection unit 210 performs the process in step S111 again. On the other hand, when determining that the detected face angle is less than 70° (within the range of ±70°) (NO), the face detection unit 210 returns to the process in step S105, and switches from the LP mode to the HP mode.

(Step S113) When determining that the detected face angle is less than 50° (within the range of ±50°) (YES), the face detection unit 210 determines that the face is facing forward, and outputs the "Attention" information to the system processing unit 310. Then, the face detection unit 210 proceeds to a process in step S115.

(Step S115) The face detection unit 210 switches from the HP mode to the LP mode under the control of the system processing unit 310, and detects a face angle based on a captured image acquired from the imaging unit 120 in the LP mode. For example, after outputting the "Attention" information to the system processing unit 310 in step S113, the face detection unit 210 waits for an instruction to switch to the LP mode from the system processing unit 310 before switching to the LP mode. Then, the face detection unit 210 returns to the process in step S101.

(Step S117) The face detection unit 210 determines whether or not the amount of change in the face angle detected in the HP mode is a change toward the front (toward) 0° by 10° or more within one second. When determining that the face angle does not change toward the front by 10° or more within one second (NO), the face detection unit 210 returns to the process in step S107. On the other hand, when determining that the face angle changes toward the front by 10° or more within one second (YES), the face detection unit 210 proceeds to a process in step S119.

(Step S119) The face detection unit 210 determines whether or not the face movement distance when the face angle changes by 10° or more in step S117 is less than the predetermined value (for example, 50% of the width of a face area (bounding box)). When determining that the face movement distance is equal to or more than the predetermined value (NO), the face detection unit 210 returns to the process in step S107. On the other hand, when determining that the face movement distance is less than the predetermined value (YES), the face detection unit 210 proceeds to a process in step S121.

Figure 13:
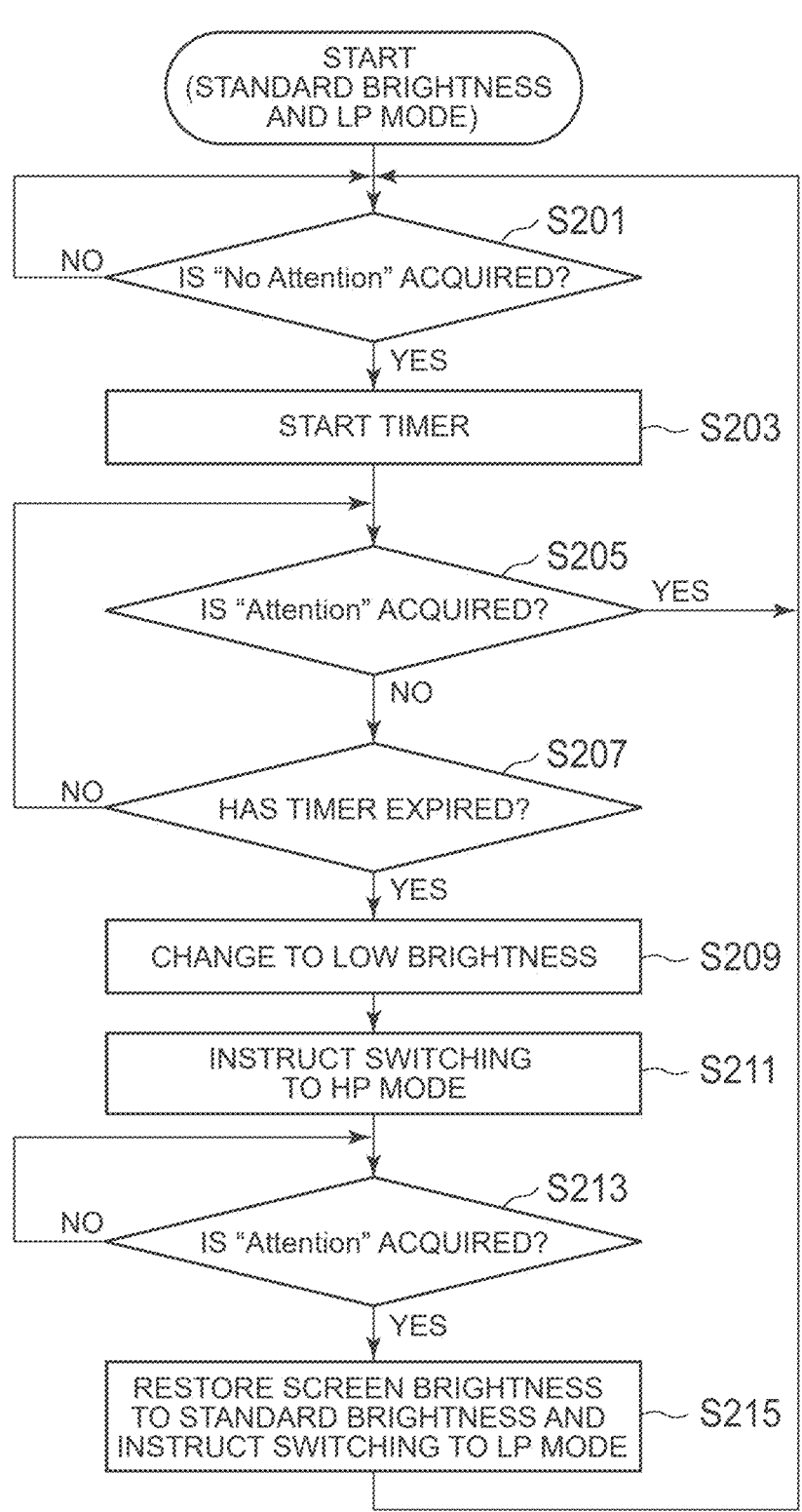
FIG. 13 is a flowchart illustrating an example of screen brightness control processing according to one or more embodiments.

Referring next to FIG. 13, the operation of screen brightness control processing executed by the system processing unit 310 will be described. FIG. 13 is a flowchart illustrating an example of screen brightness control processing according to one or more embodiments. Here, it is assumed that the information processing apparatus 1 is in the normal operating state, the face of the user is facing forward, and the screen brightness is set to the standard brightness. At this time, the detection mode of the face detection unit 210 is the LP mode.

(Step S201) The screen brightness control unit 311 determines whether or not the "No Attention" information is acquired from the face detection unit 210. When determining that the "No Attention" information is not acquired (NO), the screen brightness control unit 311 performs the process in step S201 again. On the other hand, when determining that the "No Attention" information is acquired (YES), the screen brightness control unit 311 starts measuring a waiting time using the timer 312 (step S203). Then, the screen brightness control unit 311 proceeds to a process in step S205.

(Step S205) The screen brightness control unit 311 determines whether or not to acquire the "Attention" information from the face detection unit 210. When determining that the "Attention" information is not acquired (NO), the screen brightness control unit 311 proceeds to a process in step S207.

(Step S207) The screen brightness control unit 311 determines whether or not a predetermined waiting time (for example, 10 seconds) has passed based on the value of the timer 312 (that is, whether or not the timer has expired). When determining that the predetermined waiting time (for example, 10 seconds) has not yet passed (that is, the timer has not yet expired) (step S207: NO), the screen brightness control unit 311 returns to the process in step S205. When determining that the "Attention" information is acquired before the predetermined waiting time (for example, 10 seconds) passes (step S205: YES), the screen brightness control unit 311 returns to the process in step S201. At this time, the timer 312 is reset.

On the other hand, when determining that the predetermined waiting time (for example, 10 seconds) has passed in step S207 (step S207: YES), the screen brightness control unit 311 changes the screen brightness to the low brightness (step S209). Then, the screen brightness control unit 311 proceeds to a process in step S211.

(Step S211) The screen brightness control unit 311 transmits, to the face detection unit 210, an instruction to switch to the HP mode, and proceeds to a process in step S213.

(Step S213) The screen brightness control unit 311 determines whether or not to acquire the "Attention" information from the face detection unit 210. When determining that the "Attention" information is not acquired (NO), the screen brightness control unit 311 performs the process in step S213 again. On the other hand, when determining that the "Attention" information is acquired (YES), the screen brightness control unit 311 restores the screen brightness to the standard brightness, and transmits, to the face detection unit 210, an instruction to switch to the LP mode (step S215).

Summary of Embodiments

As described above, the information processing apparatus 1 according to one or more embodiments includes a memory (for example, the system memory 304) which temporarily stores image data of a captured image captured by the imaging unit 120. Further, the information processing apparatus 1 includes the face detection unit 210 and the CPU 301 as an example of a processor. The face detection unit 210 processes the image data of the captured image stored in the memory mentioned above to execute face detection processing to detect a face area with a face captured therein and an orientation of the face from the captured image. Further, the CPU 301 executes brightness control processing to control the screen brightness of the display unit 110 based on the face orientation detected by the face detection processing mentioned above. Then, in the above face detection processing, when the detected face orientation is within a preset first angle range (for example, the range of ±50°), the face detection unit 210 determines that the face orientation is front facing (first orientation). Further, even when the detected face orientation is out of the first angle range (for example, the range of ±50°), the face detection unit 210 determines that the face orientation will be front facing before the face orientation falls within the first angle range based on the amount of change in the detected face orientation toward the front (toward the direction of the first orientation) and the face movement distance.

Thus, when detecting the orientation of the face of the user to control the screen brightness of the display unit 110, since the information processing apparatus 1 determines that the face orientation is turned to front facing before the face is fully facing forward based on the fact that the orientation of the face of the user changes toward the front, responsiveness when detecting the face orientation to control the screen brightness of the display unit 110 can be improved. Since this improved responsiveness can control the screen brightness positively according to the face orientation (for example, can reduce the screen brightness), the information processing apparatus 1 can contribute to power saving. Further, when determining that the face orientation is turned to front facing before the face is fully facing forward based on the fact that the orientation of the face of the user changes toward the front, since the information processing apparatus 1 considers not only a change in face angle from the point of view of the camera but also the face movement distance, a false determination due to the fact that the face angle changes and the changed face angle is detected due to the movement of the face position even though the face orientation does not actually change can be prevented.

For example, in the face detection processing, even in a case where the detected face orientation is out of the first angle range (for example, the range of ±50°), when the detected face orientation changes from side facing (an example of a second orientation) out of the first angle range (for example, the range of ±50°) toward the front by the predetermined angle or more (for example, 10° or more) within the predetermined time (for example, within one second), the face detection unit 210 determines whether or not the face movement distance when the face orientation changes at the predetermined angle or more is less than the predetermined value (for example, 50% of the width of a face area). Then, when the face movement distance is less than the predetermined value, the face detection unit 210 determines that the face orientation is front facing (determines that the face will be facing forward).

Thus, since it is determined that the face will be facing forward by a change in face angle when the face movement distance is short, the information processing apparatus 1 can accurately detect that the face orientation is turned to front facing before the face is fully facing forward due to the fact that the face orientation of the user changes from side facing to front facing.

Note that when the face angle changes toward the front at the predetermined angle or more (for example, 10° or more), the determination of whether or not the change is within the predetermined time (for example, within one second) may not be made. For example, in the face detection processing, even in the case where the detected face orientation is out of the first angle range (for example, the range of ±50°), when the detected face orientation changes from side facing (the example of the second orientation) out of the first angle range (for example, the range of ±50°) toward the front at the predetermined angle or more (for example, 10° or more) and the face movement distance is less than the predetermined value, the face detection unit 210 determines that the face orientation is front facing (determines that the face will be facing forward).

Thus, since it is determined that the face will be facing forward by a change in face angle when the face movement distance is short, the information processing apparatus 1 can accurately detect that the face orientation is turned to front facing before the face is fully facing forward due to the fact that the face orientation of the user changes from side facing to front facing.

Further, in the face detection processing, the face detection unit 210 performs face direction determination processing to determine whether or not the face is facing forward (whether or not the face is in the first orientation) within the second angle range (for example, the range of ±70°) wider than the first angle range (for example, the range of ±50°). Then, the face detection unit 210 performs the face direction determination processing to determine whether or not the face is facing forward based on the amount of change in the detected face orientation toward the front and the face movement distance out of the first angle range (for example, the range of ±50°) within the second angle range (for example, the range of ±70°).

Thus, even when the face is facing sideways, the information processing apparatus 1 can detect that the face will be facing forward before the face is fully facing forward based on the amount of change toward the front and the face movement distance.

Further, in the face detection processing, the face detection unit 210 sets the detection frame rate (detection cycle) when the detected face orientation (for example, the face angle) is within the first angle range (for example, the range of ±50°) lower than the detection frame rate when the detected face orientation is out of the first angle range.

Thus, the information processing apparatus 1 can suppress an increase in power consumption when the user is using the information processing apparatus 1 (when the face of the user is facing forward). Further, when the screen brightness is set to the low brightness (when the face of the user is facing sideways), the information processing apparatus 1 can increase the detection speed to make switching to the standard brightness faster when the face orientation is turned to front facing.

For example, in the face detection processing, the face detection unit 210 sets the detection frame rate (detection cycle) when the detected face orientation (for example, the face angle) is within the first angle range (for example, the range of ±50°) lower than the detection frame rate when the detected face orientation is out of the first angle range within the second angle range (for example, the range of ±70°).

Thus, the information processing apparatus 1 can suppress an increase in power consumption when the user is using the information processing apparatus 1 (when the face of the user is facing forward), or on the other hand, when the possibility of facing forward is low such as when the user is completely facing sideways or backward, the increase in power consumption can also be suppressed. Further, when the face angle is likely to be turned to front facing (when the face angle is close to the front), the detection speed of the face orientation can increase to make switching to the standard brightness faster when the face will be facing forward.

Further, in the brightness control processing, when the face orientation (for example, the face angle) detected by the face detection unit 210 changes from the first angle range (for example, the range of ±50°) to a range out of the first angle range, the CPU 301 reduces the screen brightness to the low brightness.

Thus, when the user is not using the information processing apparatus 1 (when the face of the user is facing sideways), the information processing apparatus 1 can reduce power consumption by setting, to the low brightness, the screen brightness of the display unit 110 at which the user is not looking.

Further, in the brightness control processing, when determining that the face orientation detected by the face detection unit 210 is front facing (first orientation) in such a state that the screen brightness is reduced to the low brightness, the CPU 301 restores the screen brightness to a screen brightness (to the standard brightness) before being reduced.

Thus, the information processing apparatus 1 can make the display on the display unit 110 visible when the user uses the information processing apparatus 1 (when the face of the user is facing forward).

Further, the imaging unit 120 outputs image data of an image captured by imaging the detection range FoV (the predetermined angle of view) in the direction to face the screen of the display unit 110.

Thus, the information processing apparatus 1 can properly detect the face orientation of the user using the information processing apparatus 1.

Further, a control method for the information processing apparatus 1 according to one or more embodiments includes: a face detection step of causing the face detection unit 210 to process image data of a captured image captured by the imaging unit 120 and temporarily stored in a memory (for example, the system memory 304) to detect a face area with a face captured therein and an orientation of the face from the captured image, and a brightness control step of causing the CPU 301 to control the screen brightness of the display unit 110 based on the face orientation detected by the face detection step. Further, in the face detection step, when the detected face orientation is within a preset first angle range (for example, the range of ±50°), the face detection unit 210 determines that the face orientation is front facing (first orientation), and even when the detected face orientation is out of the first angle range (for example, the range of ±50°), the face detection unit 210 determines that the face orientation is front facing before falling within the first angle range based on the amount of change in the detected face orientation toward the front (a direction of the first orientation) and a face movement distance.

Thus, when detecting the face orientation of the user to control the screen brightness of the display unit 110, since the information processing apparatus 1 determines that the face orientation is turned to front facing before the face is fully facing forward based on the fact that the face orientation of the user changes toward the front, responsiveness when detecting the face orientation to control the screen brightness of the display unit 110 can be improved. Since this improved responsiveness can control the screen brightness positively according to the face orientation (for example, can reduce the screen brightness), the information processing apparatus 1 can contribute to power saving. Further, when determining that the face orientation is turned to front facing before the face is fully facing forward based on the fact that the face orientation of the user changes toward the front, since the information processing apparatus 1 considers not only a change in face angle from a point of view of a camera but also a face movement distance, a false determination due to the fact that the face angle changes and the changed face angle is detected by the movement of the face position even though the face orientation does not actually change can be prevented.

Note that, in the aforementioned embodiments, a change in horizontal direction (left-and-right direction) is mainly described as a change in face orientation, but a change in vertical direction (up-and-down direction) is also the same. In other words, the face direction determination processing described with reference to FIG. 6 can be applied not only to the face angle in the horizontal direction (left-and-right direction) but also to the face angle in the vertical direction (up-and-down direction). Further, the face movement is not limited to the horizontal movement (the movement in the left-and-right direction), and there is also a vertical movement (a movement in the up-and-down direction). When the face moves horizontally (in the left-and-right direction), it may be detected as a change in face angle in the horizontal (yaw) direction from the point of view of the camera even if the face orientation does not change. Further, when the face moves vertically (in the up-and-down direction), it may be detected as a change in face angle in the vertical (pitch) direction from the point of view of the camera even if the face orientation does not change. Therefore, when the change in face orientation (face angle) is a yaw angle change, the detection unit 210 determines whether or not the face movement distance in the horizontal direction is less than the predetermined value. Further, when the change in face orientation (face angle) is a pitch angle change, the detection unit 210 determines whether or not the face movement distance in the vertical direction is less than the predetermined value.

Thus, when the face orientation does not actually change, the information processing apparatus 1 can prevent a false determination due to the fact that the face angle changes and the changed face angle is detected by the movement of the face position both when the face orientation of the user moves in the horizontal direction and when the face orientation of the user moves in the vertical direction.

While embodiments of this invention have been described in detail above with reference to the accompanying drawings, the specific configurations are not limited to those described above, and design changes and the like are included without departing from the scope of this invention. For example, the respective components described in the embodiments mentioned above can be combined arbitrarily.

Further, the configuration example in which the imaging unit 120 is built in the information processing apparatus 1 is described, the configuration example is not limited to this example. For example, the imaging unit 120 does not have to be built in the information processing apparatus 1, which may also be attachable to the information processing apparatus 1 (for example, onto any one of the side faces 10a, 10b, 10c, and the like) and communicably connected to the information processing apparatus 1 wirelessly or by wire as an external accessory of the information processing apparatus 1.

Further, in the aforementioned embodiments, the example in which the face detection unit 210 is provided separately from the CPU 301 and the chipset 303 is described, but some or all of the functions of the face detection unit 210 may be provided in the chipset 303, or may be provided in a processor integrated with the CPU 301 or the chipset 303. For example, the CPU 301, the chipset 303, and the face detection unit 210 may be configured as individual processors, respectively, or configured to be integrated as one processor. Further, some or all of the functions of the face detection unit 210 may be provided in the EC 200.

Further, in the aforementioned embodiments, the example in which the face detection unit 210 is provided separately from the CPU 301 and the chipset 303 is described, but some or all of the functions of the face detection unit 210 may be provided in the chipset 303, or may be provided in a processor integrated with the CPU 301 or the chipset 303. For example, the CPU 301, the chipset 303, and the face detection unit 210 may be configured as individual processors, respectively, or configured to be integrated as one processor. Further, some or all of the functions of the face detection unit 210 may be provided in the EC 200.

Further, a hibernation state, a power-off state, and the like may be included as the standby state described above. The hibernation state corresponds, for example, to S4 state defined in the ACPI specification. The power-off state corresponds, for example, to S5 state (shutdown state) defined in the ACPI specification. Note that the standby state, the sleep state, the hibernation state, the power-off state, and the like as the standby state are states lower in power consumption than the normal operating state (states of reducing power consumption).

Note that the information processing apparatus 1 described above has a computer system therein. Then, a program for implementing the function of each component included in the information processing apparatus 1 described above may be recorded on a computer-readable recording medium so that the program recorded on this recording medium is read into the computer system and executed to perform processing in each component included in the information processing apparatus 1 described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line. Further, the "computer-readable recording medium" means a portable medium such as a flexible disk, a magneto-optical disk, a flash ROM, or a CD-ROM, or a storage device such as a hard disk built in the computer system. Thus, the recording medium with the program stored thereon may be a non-transitory recording medium such as the CD-ROM.

Further, a recording medium internally or externally provided to be accessible from a delivery server for delivering the program is included as the recording medium. Note that the program may be split into plural pieces, downloaded at different timings, respectively, and then united in each component included in the information processing apparatus 1, or delivery servers for delivering respective split pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called a differential file (differential program) capable of implementing the above-described functions in combination with a program(s) already recorded in the computer system.

Further, some or all of the functions of the information processing apparatus 1 in the embodiments described above may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the information processing apparatus 1 of the aforementioned embodiments is not limited to the laptop PC, which may also be a desktop PC or the like, for example.

What is claimed is:

1. An information processing apparatus comprising:
a memory which temporarily stores image data of an image captured by an imaging unit; and a processor which processes the image data stored in the memory, wherein the processor performs
    face detection processing to process the image data of the image stored in the memory in order to detect a face area with a face captured therein and an orientation of the face from the image, and
    brightness control processing to control screen brightness of a display unit based on the orientation of the face detected by the face detection processing, and
    in the face detection processing,
      when the detected face orientation is within a preset first angle range, the processor determines that the face orientation is a first orientation, and
      even when the detected face orientation is out of the first angle range, the processor determines that the face orientation is the first orientation before falling within the first angle range based on an amount of change in the detected face orientation toward a direction of the first orientation and a face movement distance,
    in the face detection processing, even in a case where the detected face orientation is out of the first angle range,
      when the detected face orientation changes at a predetermined angle or more from a second orientation out of the first angle range toward the direction of the first orientation, the processor determines whether or not the face movement distance when the face orientation changes at the predetermined angle or more is less than a predetermined value, and
      when the face movement distance is less than the predetermined value, the processor determines that the face orientation is the first orientation.

2. The information processing apparatus according to claim 1, wherein
    in the face detection processing,
      when the change in the face orientation is a yaw angle change, the processor determines whether or not the face movement distance in a left-and-right direction is less than a predetermined value,
      while when the change in the face orientation is a pitch angle change, the processor determines whether or not the face movement distance in an up-and-down direction is less than a predetermined value.

3. The information processing apparatus according to claim 1, wherein
    in the face detection processing, even in the case where the detected face orientation is out of the first angle range,
      when the detected face orientation changes at the predetermined angle or more from the second orientation toward the direction of the first orientation within a predetermined time, and the face movement distance is less than the predetermined value, the processor determines that the face orientation is the first orientation.

4. The information processing apparatus according to claim 3, wherein
    in the face detection processing, the processor makes a detection cycle when the detected face orientation is within the first angle range lower than a detection cycle when the detected face orientation is out of the first angle range within the second angle range.

5. The information processing apparatus according to claim 4, wherein
    in the brightness control processing, when determining that the face orientation detected by the face detection processing is the first orientation in such a state that the screen brightness is reduced, the processor makes the screen brightness restored to a screen brightness before being reduced.

6. The information processing apparatus according to claim 1, wherein
    in the face detection processing, the processor performs a process of determining whether or not the face orientation is the first orientation within a second angle range wider than the first angle range, and performs a process of determining whether or not the face orientation is the first orientation in a range out of the first angle range within the second angle range based on the amount of change in the face orientation toward the direction of the first orientation and the face movement distance.

7. The information processing apparatus according to claim 1, wherein
    in the face detection processing, the processor makes a detection cycle when the detected face orientation is within the first angle range lower than a detection cycle when the detected face orientation is out of the first angle range.

8. The information processing apparatus according to claim 1, wherein
    in the brightness control processing, when the face orientation detected by the face detection processing changes from the first angle range to a range out of the first angle range, the processor reduces the screen brightness.

9. The information processing apparatus according to claim 1, wherein
    the imaging unit outputs image data of an image obtained by imaging a predetermined angle of view in a direction to face a screen of the display unit.

10. A control method for an information processing apparatus including a memory which temporarily stores image data of an image captured by an imaging unit, and a processor which processes the image data stored in the memory, the control method comprising:
    a face detection step of causing the processor to process the image data of the image stored in the memory in order to detect a face area with a face captured therein and an orientation of the face from the image; and
    a brightness control step of causing the processor to control screen brightness of a display unit based on the face orientation detected by the face detection step, wherein
    when the detected face orientation is within a preset first angle range in the face detection step, the processor determines that the face orientation is a first orientation,
    even when the detected face orientation is out of the first angle range, the processor determines that the face orientation is the first orientation before falling within the first angle range based on an amount of change in the detected face orientation toward a direction of the first orientation and a face movement distance, and
    in the face detection step, even in a case where the detected face orientation is out of the first angle range,
      when the detected face orientation changes at a predetermined angle or more from a second orientation out of the first angle range toward the direction of the first orientation, the processor determines whether or not the face movement distance when the face orientation changes at the predetermined angle or more is less than a predetermined value, and when the face movement distance is less than the predetermined value, the processor determines that the face orientation is the first orientation.

11. An information processing apparatus comprising:

a memory which temporarily stores image data of an image captured by an imaging unit; and a processor which processes the image data stored in the memory, wherein the processor performs face detection processing to process the image data of the image stored in the memory in order to detect a face area with a face captured therein and an orientation of the face from the image, and brightness control processing to control screen brightness of a display unit based on the orientation of the face detected by the face detection processing, and in the face detection processing, when the detected face orientation is within a preset first angle range, the processor determines that the face orientation is a first orientation, and even when the detected face orientation is out of the first angle range, the processor determines that the face orientation is the first orientation before falling within the first angle range based on an amount of change in the detected face orientation toward a direction of the first orientation and a face movement distance, and in the face detection processing, the processor performs a process of determining whether or not the face orientation is the first orientation within a second angle range wider than the first angle range, and performs a process of determining whether or not the face orientation is the first orientation in a range out of the first angle range within the second angle range based on the amount of change in the face orientation toward the direction of the first orientation and the face movement distance.

12. An information processing apparatus comprising:

a memory which temporarily stores image data of an image captured by an imaging unit; and a processor which processes the image data stored in the memory, wherein the processor performs face detection processing to process the image data of the image stored in the memory in order to detect a face area with a face captured therein and an orientation of the face from the image, and brightness control processing to control screen brightness of a display unit based on the orientation of the face detected by the face detection processing, and in the face detection processing, when the detected face orientation is within a preset first angle range, the processor determines that the face orientation is a first orientation, and even when the detected face orientation is out of the first angle range, the processor determines that the face orientation is the first orientation before falling within the first angle range based on an amount of change in the detected face orientation toward a direction of the first orientation and a face movement distance, and in the face detection processing, the processor makes a detection cycle when the detected face orientation is within the first angle range lower than a detection cycle when the detected face orientation is out of the first angle range.

\* \* \* \* \*